United States Patent
Herm et al.

(10) Patent No.: US 10,131,811 B2
(45) Date of Patent: Nov. 20, 2018

(54) COMPOSITION FOR FIXING WOUND ITEMS

(71) Applicant: AXALTA COATING SYSTEMS IP CO., LLC, Wilmington, DE (US)

(72) Inventors: Michael Herm, Velbert (DE); Frank-Rainer Boehm, Odenthal (DE); Ulrike Gruene De Jong, Wuppertal (DE); Peter Hoffmann, Velbert-Neviges (DE); Lars-Goeran Rohrbeck, Wuppertal (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 3 days.

(21) Appl. No.: 14/763,542

(22) PCT Filed: Jan. 24, 2014

(86) PCT No.: PCT/US2014/012930
§ 371 (c)(1),
(2) Date: Jul. 27, 2015

(87) PCT Pub. No.: WO2014/116935
PCT Pub. Date: Jul. 31, 2014

(65) Prior Publication Data
US 2015/0353766 A1 Dec. 10, 2015

Related U.S. Application Data

(60) Provisional application No. 61/756,541, filed on Jan. 25, 2013.

(51) Int. Cl.
| | | |
|---|---|---|
| B32B 27/06 | (2006.01) | |
| C09D 167/07 | (2006.01) | |
| B05D 1/18 | (2006.01) | |
| C08F 290/06 | (2006.01) | |
| C08L 67/06 | (2006.01) | |
| C08F 299/04 | (2006.01) | |
| C08G 73/16 | (2006.01) | |
| H01B 3/30 | (2006.01) | |
| H01B 3/42 | (2006.01) | |
| H01F 27/32 | (2006.01) | |
| H02K 3/30 | (2006.01) | |
| C08F 222/10 | (2006.01) | |

(52) U.S. Cl.
CPC ............ *C09D 167/07* (2013.01); *B05D 1/18* (2013.01); *C08F 290/061* (2013.01); *C08F 299/0492* (2013.01); *C08G 73/16* (2013.01); *C08L 67/06* (2013.01); *C08F 2222/1013* (2013.01); *H01B 3/306* (2013.01); *H01B 3/425* (2013.01); *H01F 27/327* (2013.01); *H02K 3/30* (2013.01); *Y10T 428/31935* (2015.04)

(58) Field of Classification Search
CPC ...... C08F 290/061; C08L 67/06; C08L 79/08; C09D 167/07; H01B 3/306; H01B 3/425
USPC ........................................................ 528/310
See application file for complete search history.

(56) References Cited

U.S. PATENT DOCUMENTS

| | | | |
|---|---|---|---|
| 3,839,358 A | 10/1974 | Bargain et al. | |
| 4,206,098 A | 6/1980 | Sattler et al. | |
| 4,525,572 A | 6/1985 | Diethelm et al. | |
| 4,888,402 A | 12/1989 | Roth et al. | |
| 5,483,004 A * | 1/1996 | Hoffmann | C08F 220/60 525/326.7 |
| 2004/0158027 A1 * | 8/2004 | Van Schijndel | C08G 69/34 528/288 |
| 2009/0162538 A1 | 6/2009 | Boehm et al. | |
| 2010/0151242 A1 | 6/2010 | Boehm et al. | |
| 2011/0160341 A1 | 6/2011 | Herm et al. | |

FOREIGN PATENT DOCUMENTS

| | | |
|---|---|---|
| DE | 460768 C | 6/1928 |
| DE | 694951 C | 8/1940 |
| DE | 695514 C | 9/1941 |
| EP | 0310972 A2 | 4/1989 |
| EP | 0549923 A2 | 7/1993 |
| EP | 0980882 A1 | 2/2000 |
| GB | 1260042 A | 1/1972 |
| GB | 1518666 A | 7/1978 |
| WO | 2008067967 A2 | 6/2008 |

OTHER PUBLICATIONS

ISA EPO, International Search Report and Written Opinion for International Application No. PCT/US2014/012930, dated Jul. 1, 2014.
ISA EPO, International Preliminary Report on Patentability for International Application No. PCT/US2014/012930, dated Aug. 6, 2015.

* cited by examiner

*Primary Examiner* — Shane Fang
(74) *Attorney, Agent, or Firm* — Lorenz & Kopf, LLP

(57) ABSTRACT

A composition for fixing wound items is provided. In one example, the composition comprises 5 to 97 wt % of at least one α,β-unsaturated polyester resin and/or α,β-unsaturated polyester imide resin comprising components of at least one α,β-ethylenically unsaturated mono-, di- and/or tricarboxylic acid, and/or its anhydride and/or ester, at least one polyol, at least one (meth)acrylic group containing component, possibly at least one mono-, di-, tri- and/or tetracarboxylic acid, which is not α,β-ethylenically unsaturated, and/or its anhydride and/or ester.

13 Claims, No Drawings

COMPOSITION FOR FIXING WOUND ITEMS

CROSS-REFERENCE TO RELATED APPLICATIONS

This application is a U.S. National-Stage entry under 35 U.S.C. § 371 based on International Application No. PCT/US2014/012930, filed Jan. 24, 2014, which was published under PCT Article 21(2) and which claims priority to Provisional Application No. 61/756,541, filed Jan. 25, 2013, which are all hereby incorporated in their entirety by reference.

FIELD OF THE INVENTION

The present invention refers to a composition for fixing wound items, in particular electrical windings in electrical equipment, providing extraordinarily good impregnation properties into the wound items while containing a very low amount of volatile organic compounds (VOC), as well as a high toughness level in the cured state combined with an excellent resistance to cracks.

BACKGROUND OF THE INVENTION

Unsaturated polyesters can be used as impregnating resins in the electrical industry, particularly for impregnating wound items such as electrical coils and windings of magnet wires in electrical devices, as well as for casting of electrical devices such as stators, rotors and transformers, in order to obtain mechanical toughening and fixing.

Impregnation materials based on unsaturated polyesters dissolved in styrene typically show excellent impregnation results due to their low viscosities and also good mechanical toughness. However, such systems show emission of styrene upon curing of the impregnation material, resulting in a significant amount of volatile organic compounds (VOC). Therefore, there is a strong demand for tough impregnation materials with low to zero emissions that offer excellent impregnation qualities.

Mechanical properties like toughness can e.g. be improved using fillers, however, impregnation materials containing such fillers are typically not very homogeneous, and their viscosities are typically high. This could cause problems regarding storage conditions of the composition and can additionally lead to failure of penetration into the cavities of electrical windings as well as to failure of impregnation quality during operation of the electrical device.

It is well-known in the art that one way to achieve a low viscosity system comprising unsaturated polyesters is the incorporation of non-polar moieties such as fatty acid derivatives into the unsaturated polyester.

Unsaturated polyester resins comprising polymeric fatty acids and/or other di-functional carboxylic acids are described in DE-A1695514, in order to improve the stability against hydrolysis. The resulting products are too soft for the use as impregnating resins in compositions for electrical insulation. DE-A1694951 discloses similar unsaturated polyesters comprising polymeric fatty alcohols instead of polymeric fatty acids.

Polycondensation of oligomeric or polymeric fatty acids and other multifunctional carboxylic acids like maleic acid or itaconic acid with multifunctional polyols is shown in EP-A0980882. After crosslinking these materials show good thermal and adhesive properties, however they are very soft and do not provide sufficient mechanical properties to be used as impregnating resins in compositions for electrical devices.

DE-A1770566 describes the preparation of unsaturated polyesters which can be used for impregnation of electrical devices containing an imide which is based on bi-cyclooctene tricarboxylic acid. The polyester may contain fatty acids. The crosslinked material shows good thermal, electrical and mechanical properties, however the resulting impregnating resin contains volatile reactive diluents resulting in a high volatile organic content (VOC) of the material.

DE-A2460768 describes unsaturated polyester imide resins for the use in impregnation compositions for electrical devices which may contain dimeric fatty acids. The resins are preferably dissolved in styrene resulting in a high volatile organic content (VOC).

WO2008/067967 describes unsaturated polyester polyols containing non-polar structures of dimeric fatty alcohols and dimeric fatty acids. These unsaturated polyester polyols are further converted into polyurethanes for coatings, elastomer and thermoplastic applications. For this purpose, the unsaturated polyester polyols must carry a minimum of two hydroxyl functionalities per polymer molecule. Such unsaturated polyester polyols are not suitable for the use in impregnating compositions for electrical devices, due to the high hydroxyl functionality which improves the interaction with electrical fields and thus decreases the insulation properties of the crosslinked material. Furthermore, the described unsaturated polyester polyols are too soft for the use in impregnating compositions for electrical devices.

It is known that low-viscous low-VOC impregnating resins typically contain a high level of reactive diluents resulting in poor mechanical properties such as strong brittleness.

SUMMARY OF THE INVENTION

The invention provides a composition for fixing wound items, the composition comprising
  A) 5 to 97 wt % of at least one $\alpha,\beta$-unsaturated polyester resin and/or $\alpha,\beta$-unsaturated polyester imide resin comprising components of at least one $\alpha,\beta$-ethylenically unsaturated mono-, di- and/or tricarboxylic acid, and/or its anhydride and/or ester, at least one polyol, at least one (meth)acrylic group containing component, possibly at least one mono-, di-, tri- and/or tetracarboxylic acid, which is not $\alpha,\beta$-ethylenically unsaturated, and/or its anhydride and/or ester, and, in case of an $\alpha,\beta$-unsaturated polyester imide resin, at least one imide having 5-membered cyclic imide moieties, in a ratio of the components, wherein at least one of the unsaturated mono-, di- and/or tricarboxylic acid and/or its anhydride and/or ester and/or the polyol and/or the mono-, di-, tri- and/or tetracarboxylic acid, which is not $\alpha,\beta$-ethylenically unsaturated and/or its anhydride and/or ester and/or, in case of the $\alpha,\beta$-unsaturated polyester imide resin, the imide having 5-membered cyclic imide moieties comprises linear and/or branched aliphatic and/or cycloaliphatic moieties with more than eight (8) carbon atoms,
  B) 0 to 60 wt % of at least one unsaturated polyester resin and/or unsaturated polyester imide resin different from A),
  C) 2 to 80 wt % of at least one monomeric and/or oligomeric unsaturated component with a vapour pressure of 0 to 1 mbar at 20° C., measured at 20° C., D) 0 to 40 wt % of at least one monomeric and/or oligomeric unsaturated component different from C) with a vapour pressure of 0 to 10 mbar at 20° C., measured at 20° C., E) 0.1 to 15 wt % of at least one additive, and F) 0 to 30 wt % of monomers and/or polymers containing epoxy and/or glycidyl ether and/or ester moieties, wherein the wt % being based on the total weight of the composition.

The composition of the present invention provides low viscosities at high content of the α,β-unsaturated polyester resin and/or α,β-unsaturated polyester imide resin, low VOC resulting in low curing emissions and, further, provides excellent impregnation properties. After curing, these impregnation materials show a high toughness level combined with an excellent resistance to cracks.

DETAILED DESCRIPTION

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The disclosure of ranges of numerical values is intended as a continuous range including every value between the minimum and maximum values.

The term typical or typically stated herein means "as such known to a person skilled in the art".

The number average molar mass Mn stated herein is determined or to be determined by gel permeation chromatography (GPC; divinylbenzene-cross-linked polystyrene as the immobile phase, tetrahydrofuran as the liquid phase, polystyrene standards) determined according to ISO 13885-1 standard.

The term (meth)acryl refers to acryl and/or methacryl in this document.

The term hydroxyl value in this document is defined as the number of mg of potassium hydroxide (KOH) which is equal to the number of mg acetic acid for acetalizing of 1 g of the resin, determined according to DIN53240 standard.

The term acid value in this document is defined as the mg of potassium hydroxide required to neutralise the acid groups of the resin, described in DIN EN ISO 2114 standard.

The composition according to the invention comprises at least one α,β-unsaturated polyester resin and/or α,β-unsaturated polyester imide resin as component A) in a range of 5 to 97 wt %, preferably 10 to 90 wt %, more preferably 15 to 85 wt %, the wt % being based on the total weight of the composition.

The resin of component A) may have a hydroxyl value of 0 to 120 mg KOH/g, preferably 0 to 80, an acid value of 0 to 70 mg KOH/g, preferably 0 to 50 mg KOH/g, and possibly a urethane group concentration of 0 to 0.1 mol per 100 g resin if at least one polyisocyanate is additionally used for the preparation of the resin A).

The component A) is obtained by reaction of (a) at least one α,β-ethylenically unsaturated mono-, di- and/or tricarboxylic acid, and/or its anhydride and/or ester, (b) at least one polyol, (c) in case of the α,β-unsaturated polyester imide resin, at least one imide having 5-membered cyclic imide moieties with the formula

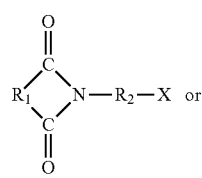

(Formula 1)

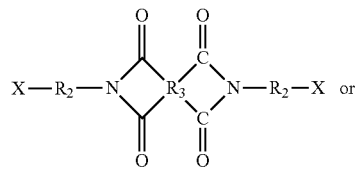

(Formula 2)

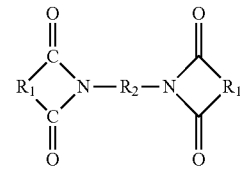

(Formula 3)

in which $R_1$ is an aliphatic, cycloaliphatic or aromatic moiety in which the carbonyl groups in $R_1$ are in a 1,2-position and that contains at least one further reactive carboxyl or hydroxyl group or a C=C double bond or combinations thereof, $R_2$ is an aliphatic, aromatic or cycloaliphatic moiety with 2 to 20 carbon atoms that may also contain oxygen or nitrogen atoms, $R_3$ is an aliphatic, cycloaliphatic or aromatic moiety in which at least 2 of 4 carbonyl groups in $R_3$ are in a 1,2-position, and X is a hydroxyl or carboxy functionality, (d) at least one (meth)acrylic group containing component, and (e) possibly at least one mono-, di-, tri- and/or tetracarboxylic acid, which is not α,β-ethylenically unsaturated and/or its anhydride and/or ester in a ratio of the components (a) to (e), wherein at least one of the components (a) to (c) or (e) comprises linear and/or branched aliphatic and/or cycloaliphatic moieties with more than eight (8) carbon atoms.

The ratio of the components (a) to (e) are chosen in such a way, known to a person skilled in the art, that 100 g of component A) contain 0.03 to 0.5 mol of polymerizable α,β-ethylenically unsaturated groups of component (a), and, in case of the polyester imide resin the amount of imidically bonded nitrogen in A) is at least 0.3 wt %, preferably at least 1.0 wt %, the wt % being based on the weight of resin A).

The number average molecular mass Mn of component A) is in a range of, for example, 400 to 10000 g/mol, preferably 600 to 3000 g/mol.

The linear and/or branched aliphatic and/or cycloaliphatic moieties with more than 8 carbon atoms can be, for example, dodecenyl succinic anhydride, castor oil and/or its derivatives, dimer fatty acids and/or dimer fatty alcohols. Preferred are dimer fatty acids and/or dimer fatty alcohols.

In one embodiment, the at least one polyol of (b) comprises the linear and/or branched aliphatic and/or cycloaliphatic moieties with more than eight (8) carbon atoms. In case the at least one mono-, di-, tri- and/or tetracarboxylic acid, which is not α,β-ethylenically unsaturated, and/or its anhydride and/or ester of (e) is used in the preparation of component A) it is preferred that the reaction component (e) comprises the linear and/or branched aliphatic and/or cycloaliphatic moieties with more than eight (8) carbon atoms.

The α,β-ethylenically unsaturated mono-, di- and/or tricarboxylic acids and/or its anhydride and/or ester of (a) are typical α,β-ethylenically unsaturated mono-, di- or tricarboxylic acids and/or its anhydride and/or ester, for example, dicarboxylic acids with 4 or 5 carbon atoms, and/or their anhydrides or esters. Examples are maleic anhydride, fumaric acid, itaconic acid and/or their anhydrides, methylene malonic acid, citraconic anhydride or mesaconic acid.

In one embodiment, maleic anhydride and/or fumaric acid are used.

Polyols of (b) are typical alcohols having more than one, preferably 2, 3 or 4, hydroxyl functionalities per molecule. Examples are di- or trifunctional alcohols with 2 to 18 carbon atoms, for example, 1,4-bishydroxymethyl cyclohexane, 2,2-bis-(4-hydroxycyclohexyl)-propane, ethylene glycol, propylene glycol, 1,3-propane diol, neopentyl glycol (NPG), trimethylol propane (TMP), glycerol, dimer fatty alcohols, castor oil, tris(hydroxyethyl)isocyanurate (THEIC) and pentaerythritol. Also possible is the use of carboxy functional alcohols such as dimethylolpropionic acid. The use of alcohols with a functionality greater than 2 leads to branched structures. Further, the alcohols can be polyether polyols, polyolefinic polyols and/or polymeric polyols, for example, polyethylene glycol, polypropylene glycol, polytetrahydrofurane, reaction products of the addition of ethylene oxide and/or propylene oxide to polyfunctional alcohols with 2 to 4 hydroxy groups like glycerol, trimethylol ethane, trimethylol propane, triethanolamine or pentaerythritol or with polyfunctional phenols with 2 to 4 hydroxyl groups like catechol, hydroquinone, bisphenol A or bisphenol F. Further examples are hydroxyl functional homo- or copolymers obtained by radical polymerization, hydroxyl functional polycarbonates or hydroxyl functional polyester with number average molar mass of 400 to 8000 g/mol, or polyolefinic polyols such as hydroxyl functional polymers of ethylene, propylene, butylene, octane, isoprene, butadiene, chloroprene and/or combinations thereof.

In one embodiment, polyols of (b) are 1,3-propane diol, neopentyl glycol, THEIC, polyethylene glycol, hydroxyl functional polybutadiene, trimethylol propane, dimer fatty alcohols and/or castor oil.

In addition to the at least one polyol of (b), small amounts of monoalcohols can be incorporated in the preparation of component A), in amounts which provide no more than 33% of the hydroxy functionality of component A), in a way as known to a person skilled in the art. Examples are 8(9)-hydroxytricyclo[5.2.1.02.6]dec-3-en, phenol, hexanol and isodecanol.

The at least one imide having 5-membered cyclic imide moieties of (c) can be typical imides which are the reaction products of tricarboxylic acids or their anhydrides, like trimellitic anhydride, 3,3',4-benzophenone tricarboxylic acid anhydride, tricarballylic acid or unsaturated cycloaliphatic, aromatic or aliphatic dicarboxylic acid anhydrides like tetrahydrophthalic anhydride, hexahydrophthalic anhydride, phthalic anhydride, endo-methylene tetrahydrophthalic anhydride, succinic anhydride, dodecenylsuccinic anhydride or maleic anhydride with aliphatic, cycloaliphatic, heterocyclic or aromatic aminoalcohols or aminocarboxylic acids. Appropriate aminoalcohols are e.g. ethanolamine, propanolamine, butanolamine, their higher homologues, 4-aminocyclohexanol, 4-aminobenzyl alcohol or aromatically amino-substituted phenyl ether alcohols. Suitable aminocarboxylic acids are e.g. aminoacetic acid, aminopropionic acid, aminocapronic acid and 4-aminobenzoic acid.

Further examples of the imide (c) are reaction products of tetracarboxylic acids or their anhydrides like pyromellitic anhydride, benzophenone tetracarboxylic acid dianhydride, butane tetracarboxylic acid dianhydride, cyclopentane tetracarboxylic acid dianhydride with aliphatic, cycloaliphatic, hetereocyclic or aromatic aminoalcohols or aminocarboxylic acids, and/or reaction products of 2 mols of tricarboxylic acids or their anhydrides like trimellitic anhydride, tricarballylic acid or 3,3',4-benzophenone tricarboxylic acid anhydride with 1 mol aromatic diamines like 4,4'-diamino diphenylmethane, 4,4'-diamino diphenylether, 4,4'-diamino diphenylsulfide, 4,4'-diamino diphenylsulfone or aliphatic and/or cycloaliphatic diamines like 4,4'-diamino dicyclohexylmethane, ethylene diamine, propylene diamine or aliphatic etheramines. Instead of the above mentioned diamines, also the respective diisocyanates can be used.

In one embodiment, imides of (c) are the reaction products of tetrahydrophthalic anhydride or trimellitic anhydride with ethanolamine.

Examples for the at least one (meth)acryl functional component of (d) are functional polyester (meth)acrylates, functional polyether (meth)acrylates, functional silicone (meth)acrylates, functional (meth)acrylated poly(butadiene) or functional urethane (meth)acrylates, in which the functional group can be, for example, a hydroxy, carboxy, epoxy and/or isocyanate group. Further examples are carboxy (meth)acrylates and their derivatives such as acid halides, hydroxy (meth)acrylates, epoxy (meth)acrylates and amino (meth)acrylates, for example, hydroxybutyl (meth)acrylate, glycidyl (meth)acrylate, trimethylolpropane di(meth)acrylate, pentaerythritol tri(meth)acrylate, (meth)acrylic acid chloride.

Preferred are glycidyl (meth)acrylate, (meth)acrylic acid chloride and hydroxyethyl (meth)acrylate.

The possibly at least one mono-, di-, tri- and/or tetracarboxylic acid, which is not α,β-ethylenically unsaturated, and/or its anhydride and/or ester of (e) can be typical aliphatic, cycloaliphatic and/or aromatic mono-, di-, tri- and/or tetracarboxylic acids, and/or their anhydrides and/or esters, especially alkyl esters having 1 to 4 carbon atoms in the alkyl chain. Examples are dicyclopentadiene dimaleinate, tetrahydrophthalic acid anhydride, endo-methylene tetrahydrophthalic anhydride, hexahydrophthalic anhydride, methylhexahydrophthalic anhydride, trimellitic anhydride, pyromellitic anhydride, terephthalic acid, isophthalic acid, tetrachlorophthalic acid, hexachlorophthalic acid, adipic acid, glutaric acid, sebacinic acid, dimer fatty acids, polymeric fatty acids, dodecenylsuccinic anhydride, carboxyfunctional derivatives of castor oil, carboxyfunctional polyolefins. Also possible is the use of hydroxyfunctional carboxylic acids such as dimethylolpropionic acid.

Preferred are carboxyfunctional derivatives of castor oil, tetrahydrophthalic anhydride, dodecenylsuccinic anhydride, dimer fatty acids and adipic acid.

Additionally, one or more polyisocyanates may be incorporated in component A), for example, polyisocyanates containing 2 or more isocyanate groups, for example, aliphatic, cycloaliphatic or aromatic diisocyanates with 6 to 18 carbon atoms like 1,6-hexamethylene diisocyanate, 2,4'- and 4,4'-dicyclohexylmethane diisocyanate, 3-Isocyanatomethyl-3,5,5-trimethyl cyclohexylisocyanate, 2,2,3- and 2,4,4-trimethyl hexamethylene diisocyanate, cyclohexanone 1,3- and 1,4-diisocyanate, 2,4- and 2,6-toluylene diisocyanate, 2,4'- and 4,4'-diphenylmethane diisocyanate, polyisocyanates that are obtained by reaction of a polyisocyanate with a substoichiometric amount of polyols, or trimerization products of above mentioned polyisocyanates, or products with biuret structures made from above mentioned polyisocyanates, or products with uretdione structures made from above mentioned polyisocyanates. Preferred are aromatic isocyanates like 2,4'- and 4,4'-diphenylmethane diisocyanate and their mixtures.

The at least one resin A) of the invention may be prepared by methods well known to a person skilled in the art, for example, by polyesterification of the reaction components (a) to (d) or (a) to (e), under heat, e.g. at temperatures of 120 to 240° C. in a melt process under inert gas or in an azeotropic process, possibly in the presence of polyesterification catalysts.

As component B) of the composition according to the invention at least one unsaturated polyester resin and/or unsaturated polyester imide resin different from A) can be used, in a range of 0 to 60 wt %, preferably 0 to 50 wt %, more preferably 0 to 40 wt %, the wt % being based on the total weight of the composition. The at least one resin of B) may have a number average molecular mass in a range of, for example, 500 to 10000 g/mol. If present, component B) is usually present in an amount of at least 0.1 wt. %.

Examples of B) are condensation products typically prepared from polybasic carboxylic acids, polyhydric alcohols and, if they contain imide, compounds with amino groups, providing the unsaturated polyester resin and/or unsaturated polyester imide resin different from A).

As component C) 2 to 80 wt %, preferably 2 to 60 wt %, the wt % being based on the total weight of the composition, of at least one monomeric and/or oligomeric unsaturated component with a vapour pressure of 0 to 1 mbar at 20° C., preferably 0 to 0.5 mbar, measured at 20° C., is used. This component can be typical ethylenically unsaturated components having one or more vinylic or allylic double bonds, which are radically polymerizable. Examples of component C) may be phthalic acid diallyl ester, triallyl isocyanurate, diallyl bisphenol A, pentaerythritol tri or tetra allyl ether. Component C) may also comprise acrylic or methacrylic acid esters like hydroxyethyl(meth)acrylate, hydroxypropyl (meth)acrylate, phenoxyethyl(meth)acrylate, dicyclopentadiene(meth)acrylate, butane diol di(meth)acrylate, hexane diol di(meth)acrylate, dipropylene glycol di(meth)acrylate, trimethylol propane di- and tri(meth)acrylate, pentaerythritol di- and tri(meth)acrylate, epoxy resin (meth)acrylates, (meth)acrylates of reaction products of a polyaddition of ethylene or propylene oxide with polyols such as trimethylol propane or pentaerythritol, and (meth)acrylates of oligo (ethylene glycol) or oligo(propylene glycol).

Preferred examples for component C) are hexane diol dimethacrylate, butane diol dimethacrylate and (meth)acrylates of reaction products of a polyaddition of ethylene oxide with trimethylol propane or mixtures thereof.

Up to 50 wt %, preferably 0 to 10 wt %, of the component C) can consist of monomers with polymerizable groups like maleic or fumaric bisalkyl esters, in which the alkyl groups contain 1 to 4 carbon atoms, or like mono- or bis-maleic imides, as such described in DE-A-2040094, DE-A-2719903, DE-A-3247058 and EP-A-0255802. If present, component C) is usually present in an amount of at least 0.1 wt. %.

As component D) 0 to 40 wt %, the wt % being based on the total weight of the composition, of at least one monomeric and/or oligomeric unsaturated component different from C) with a vapour pressure of 0 to 10 mbar at 20° C., preferably 0 to 5 mbar, measured at 20° C., is used. This component can be typical ethylenically unsaturated components having one or more vinylic or allylic double bonds, which are radically polymerizable. Examples of component D) are styrene, vinyl toluene, p-methyl styrene, tert.-butyl styrene, divinyl benzene, N-vinyl pyrrolidone, hydroxybutyl vinyl ether, butane diol vinyl ether, triethylene glycol divinyl ether, phthalic acid diallyl ester, fumaric acid diallyl ester, triallyl phosphate, triallyl isocyanurate, diallyl benzene, diallyl bisphenol A, pentaerythritol tri or tetra allyl ether. Component D) may be also acrylic or methacrylic acid esters like hydroxyethyl(meth)acrylate, hydroxypropyl (meth)acrylate, phenoxyethyl(meth)acrylate, dicyclopentadiene(meth)acrylate, butane diol di(meth)acrylate, hexane diol di(meth)acrylate, dipropylene glycol di(meth)acrylate, trimethylol propane di- and tri(meth)acrylate, pentaerythritol di- and tri(meth)acrylate, epoxy resin (meth)acrylates, (meth)acrylates of reaction products of a polyaddition of ethylene or propylene oxide with polyols such as trimethylol propane or pentaerythritol, and (meth)acrylates of oligo (ethylene glycol) or oligo(propylene glycol). If present, component D) is usually present in an amount of at least 0.1 wt. %.

Preferred examples for D) are styrene, vinyl toluene, hexane diol dimethacrylate, butane diol dimethacrylate and (meth)acrylates of reaction products of a polyaddition of ethylene oxide with trimethylol propane or mixtures thereof.

Up to 50 wt %, preferably 0 to 10 wt.-% of the component D) can consist of monomers with polymerizable groups like maleic or fumaric bis-alkyl esters, in which the alkyl groups contain 1 to 4 carbon atoms, or like mono- or bis-maleic imides as such described in DE-A-2040094, DE-A-2719903, DE-A-3247058 and EP-A-0255802. If such monomers are present they are usually present in an amount of at least 0.1 wt, % of component D).

As component E) of the invention 0.1 to 15 wt %, the wt % being based on the total weight of the composition, of at least one additive is used. This can be additives known to a person skilled in the art, for example, extenders, plasticising components, accelerators, for example metal salts, substituted amines; initiators, for example photo initiators such as chlorine containing photoinitiators, aromatic ketones, hydroxyalkyl phenones, initiators such as peroxides, hydroperoxides, ketone peroxides, heat-responsive initiators such as C—C-labile 1,2-substituted tetraphenyl ethanes having, for example, the formula YPh2C—CPh2Y with Ph: phenyl, Y: —OH, —OCH3, —OC6H5, —CH3, —CN, —NH2, —Cl or —OSi(CH3)3; stabilisers (inhibitors), for example, hydroquinones, quinones, quinone-type inhibitors, phenol-type inhibitors, organic salts of metals and/or sterically hindered aliphatic or aromatic amines; alkylphenols, alkylphenol ethers, defoamers and flow control agents. For the adjustment of special properties like curing speed, surface hardness and surface smoothness, further polymerizable oligomers, polymers or copolymers can be added, for example, liquid poly(butadiene)s like (meth)acrylated poly (butadiene), epoxy(meth)acrylates, urethane (meth)acrylates, polyester (meth)acrylates, unsaturated polyesters and polyester imides which are different from A) and B). Further additives may be fiber-like reinforcement agents based on carbon, glass, polyamide, polyester, polyacrylonitrile, polyaramide, polyamideimide or polycarbonate fibers or fillers like chalk, talc, aluminium hydroxide, quartz flour, slate flour, clay or microdolomite; organic and inorganic pigments, dyes, thixotropy-inducing agents and shrinkage reducing agents. The amount of such additives in the composition is depending on the respective application, and is known to a person skilled in the art.

As component F) of the invention 0 to 30 wt %, the wt % being based on the total weight of the composition, of monomers and/or polymers containing epoxy and/or glycidyl ether and/or ester moieties are used. This can be monomers and/or polymers such as Bisphenol A diglycidylether, bisphenol F diglycidylether and/or the appropriate oligomers and polymers, glycidol, aliphatic and/or aromatic epoxides such as styrene oxide, glycidyl methacrylate, versatic acid glycidyl ester, epoxidized poly(butadiene)s, poly(chloroprenes) and poly(isoprenes). If present, component F) is usually present in an amount of at least 0.1 wt. %.

The components A), B), C), D), E) and F) of the composition of the invention may be mixed as readily prepared materials in any sequence. The components A), B) and/or D) and/or E) and/or F) may also be dissolved in C) and D) afterwards mixed together, and the components A), B) and/or C) and/or E) and/or F) may also be dissolved in D) and afterwards mixed together. It is also possible to pre-mix components C) and D), and then dissolve components A) and/or B) and/or E) and/or F) in this mixture.

The use of the composition according to the invention may be proceeded by processes known in the art, for example, by dip impregnation, vacuum impregnation or trickle impregnation. In the dip impregnation process, the substrates are dipped into the composition for a certain time or pulled through the composition. The substrate may be heated to temperatures below the curing temperature of the composition before dipping. In the vacuum impregnation process, the substrates are placed into a closed container, vacuum is applied, then the composition of the invention can be flushed into the container. In the trickle impregnation process, the composition according to this invention can be trickled with e.g. a nozzle onto a rotating substrate.

It can be useful to heat the substrate to temperatures below the curing temperature of the composition, for a good penetration. The heating may be provided by methods known in the art, for example, by electrical current or in an oven, for example, during or before impregnation application.

After the impregnation application the applied composition according to this invention can be cured. This can be proceeded, for example, by radical polymerization, and for this radical polymerization it is useful to add radical initiators as part of component E) to the composition of the invention. The curing may be carried out by heating the impregnated substrate and/or by irradiation the impregnated substrate with high-energy radiation.

The heat for curing can be produced, for example, by passing an electrical current through the windings; it is also possible to use an oven or an infrared (IR) or a near infrared radiation (NIR) source. The heating temperature (object temperature) may be in the range of 80 to 180° C. Typical curing times are, for example, 1 minute to 180 minutes, in case of NIR radiation the curing time may be shorter, for example, below 1 minute. The composition according to an exemplary embodiment can also be cured at temperatures below 80° C., for example at ambient temperatures, under the use of additives such as aromatic amines or salts of cobalt, copper, cerium, vanadium etc.

The composition according to an exemplary embodiment can also be cured by the application of high-energy radiation, e.g. ultraviolet (UV) light or electron beam. For UV curing, adequate initiators can be used, for example, photoinitiators that absorb in a wavelength range of 190 to 450 nm.

Also the combination of photoinitiators with thermally labile initiators is possible, e.g. for a combination of heat curing and UV curing.

The high-energy radiation may be used for the acceleration of the curing process, but also for the through-curing of the applied composition, depending on the impregnation layer thickness. UV- and electron beam radiation can also be used to cure only the surface of the impregnation composition of the invention applied on the substrate, in order to reduce emission of volatile monomers of the composition in a thermal curing step afterwards.

The compositions according to this invention can be used in several fields of applications. They are especially useful for fixing wound items, e.g. coiled substrates, especially coiled wires like magnet wires in electrical devices like rotors, stators or transformers, or of coiled metal foils in the electrical sector, or coiled substrates on the basis of glass fibers, plastic fibers or plastic foils, and may also be used for the impregnation of fabrics.

An exemplary embodiment will now be described by the following, non-limiting examples:

Example 1

Composition of Prior Art a):
Composition of prior art a) is the commercial DuPont impregnating resin Voltatex® 4302: A flexible impregnating resin based on an unsaturated polyester which does not fulfil the composition of (A) according to an exemplary embodiment, dissolved in an oligomeric acrylate.
Viscosity at 25° C.: 7300 mPas.

Example 2

Composition of Prior Art b):
Composition of prior art b) is the commercial DuPont impregnating resin Voltatex® 4303: A hard impregnating resin based on an unsaturated polyester which does not fulfil the composition of (A) according to an exemplary embodiment, dissolved in an oligomeric acrylate.
Viscosity at 25° C.: 900 mPas.

Example 3

Composition according to an exemplary embodiment.
Component (A) is an unsaturated polyester based on maleic anhydride, neopentyl glycol, tetrahydrophthalic anhydride, ethanolamine and dimeric fatty acid, which is further reacted with a reactive methacrylic acid derivative. Component (A) has the following properties: acid value 7 mg KOH/g, average crosslinking functionality=2.
57 parts by weight of component (A) are heated to 100° C. and dissolved in 41 parts by weight of 1,4-butane diol dimethacrylate (component (C)). After cooling to <40° C., 1.4 parts by weight of a C—C radical initiator (benzpinakol ether, component (E)) are added and mixed well.
Viscosity at 25° C.: 310 mPas.
Tests:
Curing loss.

The curing loss was determined acc. to EN60455-3-5: 2006 with 10 g of the liquid impregnation materials as described in examples 1-3:

Example 1 (prior art a)): Curing loss=0.5 wt.-%
Example 2 (prior art b)): Curing loss=0.5 wt.-%
Example 3 (acc. to an exemplary embodiment): Curing loss=1.5 wt.-%

Thus, all materials are categorized as low-emission impregnating resins.

Hardness:

20 g of the liquid impregnation material as described in examples 1-3 are poured into an aluminium dish (64 mm upper diameter, 10 mm height). The impregnation material is heated in a convection oven at 150° C. for 1 hour. After curing, the Shore-D hardness is determined (Shore-D-Hardness in acc. with IEC 60455-2, Test Method in acc. with ISO 868):

| Material | Hardness (Shore-D) |
|---|---|
| Example 1 (prior art a)) | 47 |
| Example 2 (prior art b)) | 81 |
| Example 3 (exemplary embodiment) | 66 |

Tendency to crack.

The tendency to crack is measured according to the Axalta Coating Systems internal Voltatex® standard 010:

Aluminium dishes (64 mm upper diameter, 10 mm height) are loaded with 30 pieces of copper wire each (2-2.5 cm length, 1 mm diameter). Per impregnation material, one dish is filled with 20 g, one with 10 g and one with 5 g of the impregnation material. The impregnation material is cured in a convection oven at 150° C. for 1 hour. After cooling, the cured impregnation materials are taken out of the dishes and are optically checked for cracks.

| Material | Tendency to crack |
|---|---|
| Example 1 (prior art a)) | few cracks |
| Example 2 (prior art b)) | many cracks |
| Example 3 (exemplary embodiment) | none to few cracks |

As the data shows, the impregnation materials according to an exemplary embodiment provide a unique combination of excellent impregnation properties due to low viscosities, low curing emissions and—after curing—a high toughness level as well as an excellent resistance to cracking.

The invention claimed is:

1. A composition for fixing wound items, the composition comprising:
   A) 5 to 97 wt % of α,β-unsaturated polyester imide resin comprising components of at least one α,β-ethylenically unsaturated mono-, di- and/or tricarboxylic acid, and/or its anhydride and/or ester, at least one polyol, at least one (meth)acrylic group containing component, possibly at least one mono-, di-, tri- and/or tetracarboxylic acid, which is not α,β-ethylenically unsaturated, and/or its anhydride and/or ester, and, at least one imide having 5-membered cyclic imide moieties, in a ratio of the components, wherein at least one of the unsaturated mono-, di- and/or tricarboxylic acid and/or its anhydride and/or ester and/or the polyol and/or the mono-, di-, tri- and/or tetracarboxylic acid, which is not α,β-ethylenically unsaturated, and/or its anhydride and/or ester and/or the imide having 5-membered cyclic imide moieties comprises linear and/or branched aliphatic and/or cycloaliphatic moieties with more than eight (8) carbon atoms of dodecenyl succinic anhydride, dimer fatty acids and/or dimer fatty alcohols;
   B) 0 to 60 wt % of at least one unsaturated polyester resin and/or unsaturated polyester imide resin different from A);
   C) 2 to 80 wt % of at least one monomeric and/or oligomeric unsaturated component with a vapour pressure of 0 to 1 mbar at 20° C., measured at 20° C.;
   D) 0 to 40 wt % of at least one monomeric and/or oligomeric unsaturated component different from C) with a vapour pressure of 0 to 10 mbar at 20° C., measured at 20° C.;
   E) 0.1 to 15 wt % of at least one additive; and
   F) 0 to 30 wt % of monomers and/or polymers containing epoxy and/or glycidyl ether and/or ester moieties,
   wherein the wt % being based on the total weight of the composition; and
   wherein a wound item fixed with the composition after curing exhibits improved resistance to cracking as compared to a wound item fixed with a composition free of the at least one of the unsaturated mono-, di- and/or tricarboxylic acid and/or its anhydride and/or ester and/or the polyol and/or the mono-, di-, tri- and/or tetracarboxylic acid, which is not α,β-ethylenically unsaturated, and/or its anhydride and/or ester and/or the imide having 5-membered cyclic imide moieties comprising linear and/or branched aliphatic and/or cycloaliphatic moieties with more than eight (8) carbon atoms of dodecenyl succinic anhydride, dimer fatty acids and/or dimer fatty alcohols and after curing.

2. The composition according to claim 1 comprising 10 to 90 wt % of the at least one α,β-unsaturated polyester imide resin of component A).

3. The composition according to claim 1, wherein component A) is obtained by reaction of
   (a) at least one α,β-ethylenically unsaturated mono-, di- and/or tricarboxylic acid, and/or its anhydride and/or ester;
   (b) at least one polyol;
   (c) at least one imide having 5-membered cyclic imide moieties with the formula $$R_1 \underset{\underset{O}{\|}}{\overset{\overset{O}{\|}}{C}} N-R_2-X \quad \text{or} \tag{Formula 1}$$

$$X-R_2-N \underset{\underset{O}{\|}}{\overset{\overset{O}{\|}}{C}} R_3 \underset{\underset{O}{\|}}{\overset{\overset{O}{\|}}{C}} N-R_2-X \quad \text{or} \tag{Formula 2}$$

$$R_1 \underset{\underset{O}{\|}}{\overset{\overset{O}{\|}}{C}} N-R_2-N \underset{\underset{O}{\|}}{\overset{\overset{O}{\|}}{C}} R_1 \tag{Formula 3}$$

in which
R1 is an aliphatic, cycloaliphatic or aromatic moiety in which the carbonyl groups in R1 are in a 1,2-position and that contains at least one further reactive carboxyl or hydroxyl group or a C=C double bond or combinations thereof,
R2 is an aliphatic, aromatic or cycloaliphatic moiety with 2 to 20 carbon atoms that may also contain oxygen or nitrogen atoms,
R3 is an aliphatic, cycloaliphatic or aromatic moiety in which at least 2 of 4 carbonyl groups in R3 are in a 1,2-position, and
X is a hydroxyl or carboxy functionality,
(d) at least one (meth)acrylic group containing component, and
(e) possibly at least one mono-, di-, tri- and/or tetracarboxylic acid, which is not α,β-ethylenically unsaturated, and/or its anhydride and/or ester,
in a ratio of the components (a) to (e), wherein at least one of the components (a) to (c) or (e) comprises linear and/or branched aliphatic and/or cycloaliphatic moieties with more than eight (8) carbon atoms.

4. The composition according to claim, 3 wherein the ratio of the components (a) to (e) is chosen in such a way, that 100 g of component A) contain 0.03 to 0.5 mol of polymerizable α,β-ethylenically unsaturated groups of component (a) the amount of imidically bonded nitrogen in A) is at least 0.3 wt % being based on the weight of resin A).

5. The composition according to claim, 1 wherein the linear and/or branched aliphatic and/or cycloaliphatic moieties with more than 8 carbon atoms are dimer fatty acids and/or dimer fatty alcohols.

6. The composition according to claim, 1 wherein the at least one polyol comprises the linear and/or branched aliphatic and/or cycloaliphatic moieties with more than eight (8) carbon atoms.

7. The composition according to claim, 1 wherein the at least one mono-, di-, tri- and/or tetracarboxylic acid, which is not α,β-ethylenically unsaturated, and/or its anhydride and/or ester comprises the linear and/or branched aliphatic and/or cycloaliphatic moieties with more than eight (8) carbon atoms.

8. The composition according to claim, 1 wherein the α,β-ethylenically unsaturated mono-, di- and/or tricarboxylic acid and/or its anhydride and/or ester are dicarboxylic acids with 4 or 5 carbon atoms, and/or their anhydrides or esters.

9. The composition according to claim, 1 wherein the polyols are 1,3-propane diol, neopentyl glycol, THEIC, polyethylene glycol, hydroxyl functional polybutadiene, trimethylol propane, dimer fatty alcohols and/or castor oil.

10. The composition according to claim, 1 wherein the at least one monomeric and/or oligomeric unsaturated component C) has a vapour pressure of 0 to 0.5 mbar, measured at 20° C.

11. A process of preparation of a composition for fixing wound items comprising the step of:
preparing the composition, wherein the composition comprises:
A) 5 to 97 wt % of at least one α,β-unsaturated polyester imide resin comprising components of at least one α,β-ethylenically unsaturated mono-, di- and/or tricarboxylic acid, and/or its anhydride and/or ester, at least one polyol, at least one (meth)acrylic group containing component, possibly at least one mono-, di-, tri- and/or tetracarboxylic acid, which is not α,β-ethylenically unsaturated, and/or its anhydride and/or ester, and at least one imide having 5-membered cyclic imide moieties, in a ratio of the components, wherein at least one of the unsaturated mono-, di- and/or tricarboxylic acid and/or its anhydride and/or ester and/or the polyol and/or the mono-, di-, tri- and/or tetracarboxylic acid, which is not α,β-ethylenically unsaturated, and/or its anhydride and/or ester and/or the imide having 5-membered cyclic imide moieties comprises linear and/or branched aliphatic and/or cycloaliphatic moieties with more than eight (8) carbon atoms;
B) 0 to 60 wt % of at least one unsaturated polyester resin and/or unsaturated polyester imide resin different from A);
C) 2 to 80 wt % of at least one monomeric and/or oligomeric unsaturated component with a vapour pressure of 0 to 1 mbar at 20° C., measured at 20° C.;
D) 0 to 40 wt % of at least one monomeric and/or oligomeric unsaturated component different from C) with a vapour pressure of 0 to 10 mbar at 20° C., measured at 20° C.;
E) 0.1 to 15 wt % of at least one additive; and
F) 0 to 30 wt % of monomers and/or polymers containing epoxy and/or glycidyl ether and/or ester moieties,
wherein the wt % being based on the total weight of the composition, and where preparing the composition comprises mixing the components A) to F) in any sequence; and
wherein a wound item fixed with the composition after curing exhibits improved resistance to cracking as compared to a wound item fixed with a composition free of the at least one of the unsaturated mono-, di- and/or tricarboxylic acid and/or its anhydride and/or ester and/or the polyol and/or the mono-, di-, tri- and/or tetracarboxylic acid, which is not α,β-ethylenically unsaturated, and/or its anhydride and/or ester and/or the imide having 5-membered cyclic imide moieties comprising linear and/or branched aliphatic and/or cycloaliphatic moieties with more than eight (8) carbon atoms of dodecenyl succinic anhydride, dimer fatty acids and/or dimer fatty alcohols and after curing.

12. A process of fixing wound items comprising the steps of:
using a composition by dip impregnation, vacuum impregnation or trickle impregnation to form an applied composition, wherein the composition comprises:
A) 5 to 97 wt % of at least one and/or α,β-unsaturated polyester imide resin comprising components of at least one α,β-ethylenically unsaturated mono-, di- and/or tricarboxylic acid, and/or its anhydride and/or ester, at least one polyol, at least one (meth)acrylic group containing component, possibly at least one mono-, di-, tri- and/or tetracarboxylic acid, which is not α,β-ethylenically unsaturated, and/or its anhydride and/or ester, and at least one imide having 5-membered cyclic imide moieties, in a ratio of the components of the α,β-unsaturated polyester imide resin, wherein at least one of the unsaturated mono-, di- and/or tricarboxylic acid and/or its anhydride and/or ester and/or the polyol and/or the mono-, di-, tri- and/or tetracarboxylic acid, which is not α,β-ethylenically unsaturated, and/or its anhydride and/or ester and/or the imide having 5-membered cyclic imide moieties comprises linear and/or branched aliphatic and/or cycloaliphatic moieties with more than eight (8) carbon atoms of dodecenyl succinic anhydride, dimer fatty acids and/or dimer fatty alcohols;
B) 0 to 60 wt % of at least one unsaturated polyester resin and/or unsaturated polyester imide resin different from A);
C) 2 to 80 wt % of at least one monomeric and/or oligomeric unsaturated component with a vapour pressure of 0 to 1 mbar at 20° C., measured at 20° C.;
D) 0 to 40 wt % of at least one monomeric and/or oligomeric unsaturated component different from C) with a vapour pressure of 0 to 10 mbar at 20° C., measured at 20° C.;
E) 0.1 to 15 wt % of at least one additive; and
F) 0 to 30 wt % of monomers and/or polymers containing epoxy and/or glycidyl ether and/or ester moieties,
wherein the wt % being based on the total weight of the composition; and
wherein a wound item fixed with the composition after curing exhibits improved resistance to cracking as compared to a wound item fixed with a composition free of the at least one of the unsaturated mono-, di- and/or tricarboxylic acid and/or its anhydride and/or ester and/or the polyol and/or the mono-, di-, tri- and/or tetracarboxylic acid, which is not $\alpha,\beta$-ethylenically unsaturated, and/or its anhydride and/or ester and/or the imide having 5-membered cyclic imide moieties comprising linear and/or branched aliphatic and/or cycloaliphatic moieties with more than eight (8) carbon atoms of dodecenyl succinic anhydride, dimer fatty acids and/or dimer fatty alcohols and after curing; and
curing the applied composition.

13. A wound item fixed with a composition, wherein the composition comprise:
A) 5 to 97 wt % of at least one $\alpha,\beta$-unsaturated polyester imide resin comprising components of at least one $\alpha,\beta$-ethylenically unsaturated mono-, di- and/or tricarboxylic acid, and/or its anhydride and/or ester, at least one polyol, at least one (meth)acrylic group containing component, possibly at least one mono-, di-, tri- and/or tetracarboxylic acid, which is not $\alpha,\beta$-ethylenically unsaturated, and/or its anhydride and/or ester, and at least one imide having 5-membered cyclic imide moieties, in a ratio of the components of the $\alpha,\beta$-unsaturated polyester imide resin, wherein at least one of the unsaturated mono-, di- and/or tricarboxylic acid and/or its anhydride and/or ester and/or the polyol and/or the mono-, di-, tri- and/or tetracarboxylic acid, which is not $\alpha,\beta$-ethylenically unsaturated, and/or its anhydride and/or ester and/or the imide having 5-membered cyclic imide moieties comprises linear and/or branched aliphatic and/or cycloaliphatic moieties with more than eight (8) carbon atoms of dodecenyl succinic anhydride, dimer fatty acids and/or dimer fatty alcohols;
B) 0 to 60 wt % of at least one unsaturated polyester resin and/or unsaturated polyester imide resin different from A);
C) 2 to 80 wt % of at least one monomeric and/or oligomeric unsaturated component with a vapour pressure of 0 to 1 mbar at 20° C., measured at 20° C.;
D) 0 to 40 wt % of at least one monomeric and/or oligomeric unsaturated component different from C) with a vapour pressure of 0 to 10 mbar at 20° C., measured at 20° C.;
E) 0.1 to 15 wt % of at least one additive; and
F) 0 to 30 wt % of monomers and/or polymers containing epoxy and/or glycidyl ether and/or ester moieties,
wherein the wt % being based on the total weight of the composition; and
wherein a wound item fixed with the composition after curing exhibits improved resistance to cracking as compared to a wound item fixed with a composition free of the at least one of the unsaturated mono-, di- and/or tricarboxylic acid and/or its anhydride and/or ester and/or the polyol and/or the mono-, di-, tri- and/or tetracarboxylic acid, which is not $\alpha,\beta$-ethylenically unsaturated, and/or its anhydride and/or ester and/or the imide having 5-membered cyclic imide moieties comprising linear and/or branched aliphatic and/or cycloaliphatic moieties with more than eight (8) carbon atoms of dodecenyl succinic anhydride, dimer fatty acids and/or dimer fatty alcohols and after curing.

* * * * *